United States Patent
Nava et al.

(10) Patent No.: US 12,246,480 B2
(45) Date of Patent: Mar. 11, 2025

(54) OVEN FOR PREFORMS

(71) Applicant: SMI S.P.A. CON SOCIO UNICO, Bergamo (IT)

(72) Inventors: Angelo Nava, Bergamo (IT); Valentina Clivati, Bergamo (IT)

(73) Assignee: SMI S.P.A. CON SOCIO UNICO, Bergamo (IT)

( * ) Notice: Subject to any disclaimer, the term of this patent is extended or adjusted under 35 U.S.C. 154(b) by 175 days.

(21) Appl. No.: 16/297,317

(22) Filed: Mar. 8, 2019

(65) Prior Publication Data
US 2019/0275727 A1    Sep. 12, 2019

(30) Foreign Application Priority Data

Mar. 9, 2018 (IT) .................. 102018000003400

(51) Int. Cl.
*B29C 49/64* (2006.01)
*B29C 49/42* (2006.01)
(Continued)

(52) U.S. Cl.
CPC .... *B29C 49/6472* (2013.01); *B29C 49/42085* (2022.05); *B29C 49/4236* (2013.01);
(Continued)

(58) Field of Classification Search
CPC .................. B29C 49/6472; B29C 49/4236
(Continued)

(56) References Cited

U.S. PATENT DOCUMENTS 3,947,243 A * 3/1976 Sokolow ............... B29B 13/024
                                                          432/124
4,053,346 A * 10/1977 Amberg ................ B29C 61/025
                                                          156/446
(Continued)

FOREIGN PATENT DOCUMENTS

CN      101668624 A     3/2010
DE      197 57 818 A1   7/1999
(Continued)

OTHER PUBLICATIONS

Definition of Integral, Merriam-Webster Dictionary, https://www.merriam-webster.com/dictionary/integral (Year: 2021).*
(Continued)

*Primary Examiner* — Russell E Sparks
(74) *Attorney, Agent, or Firm* — Merchant & Gould P.C.

(57) ABSTRACT

An oven for preforms and in particular a preform rotation system heats portions of the preform in a preferential manner. An oven (1) for blowing or stretch-blowing preforms (P) to provide containers (C) with oval section includes a path (2) for the preforms (P), transfer system (3) of the preforms (P) from a transport system upstream of the oven (1) and a transfer system (4) of the heated preforms (P) from the oven (1) to a downstream transport. Mandrels (9) are slidingly carried along the path (2), the mandrels temporarily engage with the preforms (P) to conduct the preforms along the path (2). The oven (1) includes at least one first heating module (10) and at least one second heating module (10'). The oven (1) includes elements (22, 25) for rotating the preforms (P) by 180°, the elements being in median position of the second heating module (10').

6 Claims, 3 Drawing Sheets

(51) Int. Cl.
    *B29C 49/68* (2006.01)
    *B29L 31/00* (2006.01)
(52) U.S. Cl.
    CPC ...... *B29C 49/6436* (2013.01); *B29C 49/6445* (2013.01); *B29C 49/68* (2013.01); *B29L 2031/7158* (2013.01)
(58) Field of Classification Search
    USPC .................................................. 425/126.1
    See application file for complete search history.

(56) References Cited

U.S. PATENT DOCUMENTS

| | | | | |
|---|---|---|---|---|
| 5,681,521 | A * | 10/1997 | Emmer | B29C 49/6445 425/526 |
| 6,428,735 | B1 * | 8/2002 | Deemer | B29C 49/0078 264/454 |
| 9,039,405 | B2 * | 5/2015 | Zacche | B29C 49/4215 425/526 |
| 9,296,148 | B2 * | 3/2016 | Feuilloley | B29C 49/6436 |
| 9,393,732 | B2 * | 7/2016 | Winzinger | B29C 49/6409 |
| 10,549,472 | B2 * | 2/2020 | Klatt | B29C 49/6418 |
| 11,724,433 | B2 * | 8/2023 | Mellen | B29C 49/6418 215/382 |

FOREIGN PATENT DOCUMENTS

| | | |
|---|---|---|
| DE | 10 12 765 A1 | 9/2001 |
| DE | 10 2016 005 272 A1 | 11/2017 |
| EP | 0 920 974 A2 | 6/1999 |

OTHER PUBLICATIONS

Definition of Median, Merriam-Webster Dictionary, https://www.merriam-webster.com/dictionary/median (Year: 2021).*

Italian Search Report for corresponding Italian Patent Application No. 102018000003400 mailed Nov. 9, 2018, 9 pages.

Chinese Office Action for Chinese Patent Application No. 201910180064.7 mailed Jan. 6, 2022, 7 pages.

* cited by examiner

OVEN FOR PREFORMS

This application claims benefit of Serial No. 102018000003400, filed 9 Mar. 2018 in Italy and which application is incorporated herein by reference. To the extent appropriate, a claim of priority is made to the above-disclosed application.

FIELD OF THE INVENTION

The present invention relates to an oven for preforms and in particular to a preform rotation system in order to heat some portions of the preform itself in a preferential manner.

BACKGROUND ART

Obtaining containers by blowing suitable, appropriately heated preforms made of plastic material in a mold of the desired shape is a widely known technique in the packaging sector, in particular for making bottles for beverages.

There are substantially two different techniques, simple blowing and stretch-blowing, which includes pneumatic blowing and the concurrent mechanical stretching of the preform in the mold. In both cases, the preforms must reach the blowing or stretch-blowing machine in a thermal condition which corresponds to the softening point of the material, so as to be able to be plastically deformed inside the molds.

The preforms are softened in special ovens which comprise a series of heating modules, typically infrared modules, arranged in series along the path of the preforms.

Normally, it is necessary to heat the body of the preforms in uniform manner, so as to achieve by blowing or stretch-blowing a container with walls of thickness as uniform as possible. However, if containers with oval cross-section are desired, a uniform heating of the body of the preform would produce different thicknesses in the areas of the body of the blown or stretch-blown bottle, in particular thicker at the long side of the oval and thinner at the short sides.

There are ovens for preforms with differentiated heating systems which can obtain, in the step of blowing or stretch-blowing, containers of oval cross-section having substantially uniform wall thicknesses. However, such systems are complex and costly.

SUMMARY OF THE INVENTION

The problem addressed by the present invention is to make available an oven for preforms which makes it possible to heat in differentiated manner the body of the preforms in order to obtain, in the step of blowing or stretch-blowing, containers with oval cross-section of substantially uniform wall thickness, of simple construction and low cost.

Such problem is solved by an oven for preforms as outlined in the accompanying claims, the definitions of which form an integral part of the present description.

Further features and advantages of the present invention will be apparent from the description of some examples of embodiment, given here by way of non-limiting example with reference to the attached figures.

DETAILED DESCRIPTION OF THE INVENTION

Figure 1:
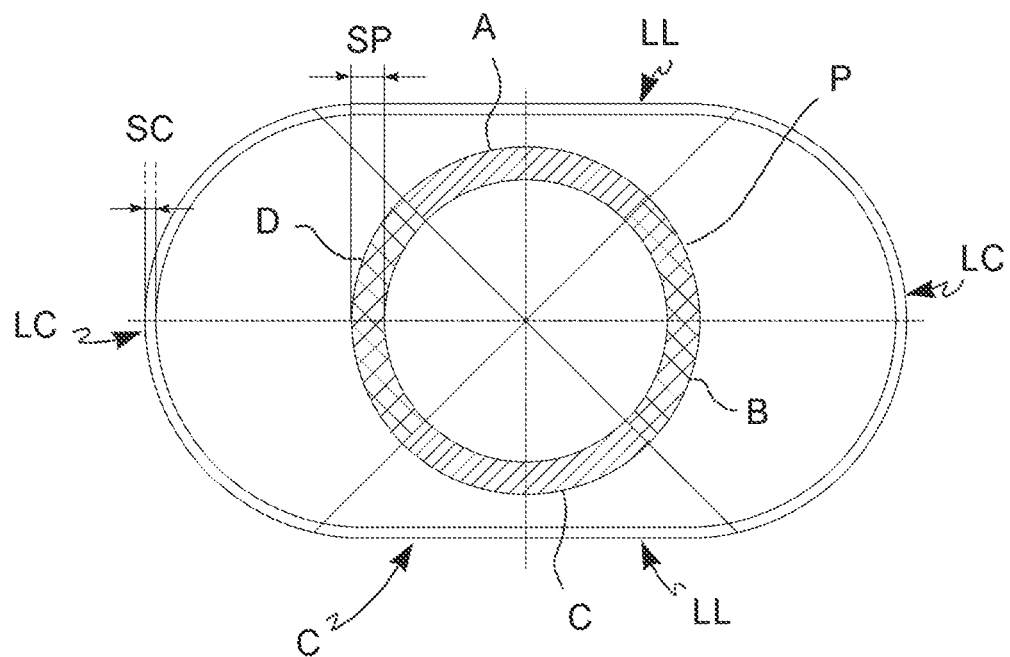
FIG. 1 is a cross view of an oval-shaped container which can be manufactured with the oven of the invention and of the relative preform.

FIG. 1 shows a comparison between the cross-section of an oval-shaped container C of and the respective preform P. The container C comprises two long sides LL and two short sides LC which connect in curved manner to the long sides LL. The long sides LL may be straight (as shown in the figure) or slightly convex. The container C may also display corrugations, strictures or in high- or low-relief portions on its surface and/or on its body, which however are not shown in the figure, because they are part of the usual customizations of manufacturers.

The preform P has a circular section and a wall thickness SP greater than the thickness SC of the walls of the container C. In order to achieve, in the container C, after blowing or stretch-blowing, a uniform wall thickness SC (such as that shown in the figure), it is necessary to subdivide the cylindrical surface of the preform P ideally into four semicircular sections A, B, C, D, each of which of amplitude of approximately 90°. Sections A and C are the ones which will correspond to the long sides LL of the container and which must therefore undergo a longer heating in the oven, while sections B and D, corresponding to the short sides LC of the container C, require less preheating.

The oven for preforms P according to the invention, indicated as a whole by the reference number 1, makes it possible to obtain a differentiated preheating of sections A, C and B, D in simple, cost-effective manner.

The oven 1 comprises a path 2 for the preforms P, transfer means 3 of the preforms P from an upstream transport system (not shown) to the oven and transfer means 4 of the preforms P heated by the oven 1 to downstream transport means (not shown).

The transfer means 3, 4 are of known type. For example, the transfer means 4 which pick the heated preforms from the path 2 of the oven 1 comprise a handling system 5 which, in the example shown, comprises a rotating plate 6 on which two gripper assemblies 7 are rotatably mounted, in which the grippers are operated by appropriate cams which cause, in synchronized and concerted manner, their rotation about the hinge axis, moving them from a retracted position to an advanced position and opening-closing the respective jaws.

Figure 2:
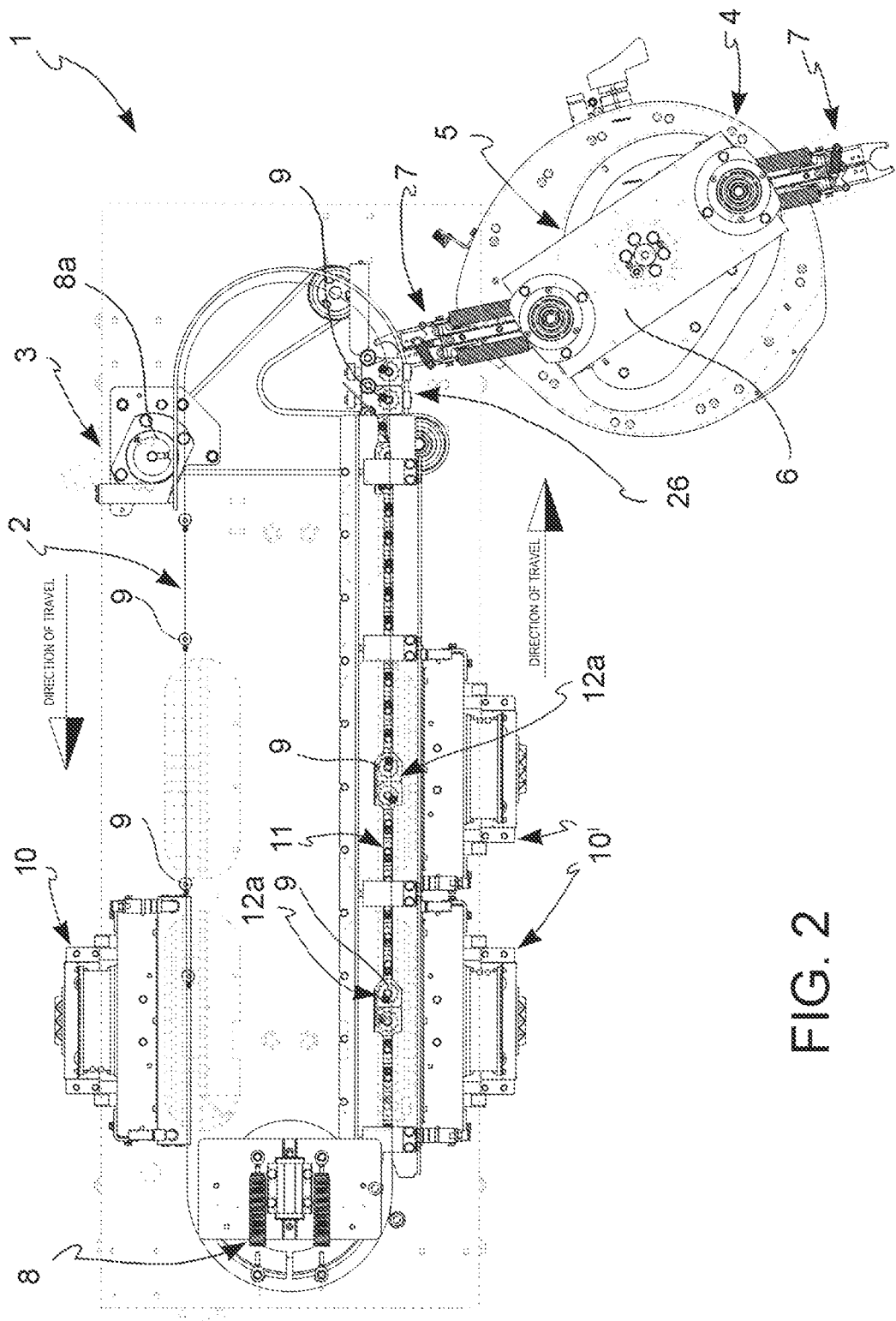
FIG. 2 is a top plan view of the oven for preforms according to the invention.

Along the path 2, a plurality of mandrels 9 is slidably supported, configured so as to engage temporarily with the preforms P to lead them along the path 2 so as to obtain their heating. For the sake of simplicity, only some mandrels 9 are shown in FIG. 2, but it should be understood that the mandrels 9 will be sufficient in number to proceed along the path 2 in substantial contact with one another.

The oven 1 further comprises means for rotating of said preforms P by 180°, so as to heat in differentiated manner, with reference to FIG. 1, the semicircular sections A and C with respect to the semicircular sections B and D.

The path 2 of the preforms P typically comprises two straight stretches and two curved stretches which connect at the two ends of the rectilinear stretches according to an arc-shaped path. Means 8 for moving the mandrels 9, e.g.

rotatable driving wheels 8a, which impart movement to the mandrels 9, are positioned at the curved portions of path 2 so that the mandrels 9, along the rectilinear segments, advance pushed by those upstream.

Heating modules 10 are arranged along the path 2.

The heating modules 10 typically comprise heating elements, normally infrared heating elements and reflective surfaces arranged appropriately to maximize the heat radiation directed towards the preform.

The oven 1 shown in FIG. 1 comprises three heating modules 10, 10', but there may be a different number of heating modules in other ovens. The oven 1 generally comprises at least one first heating unit 10 and at least one or preferably at least two second heating modules 10'.

Figure 5:
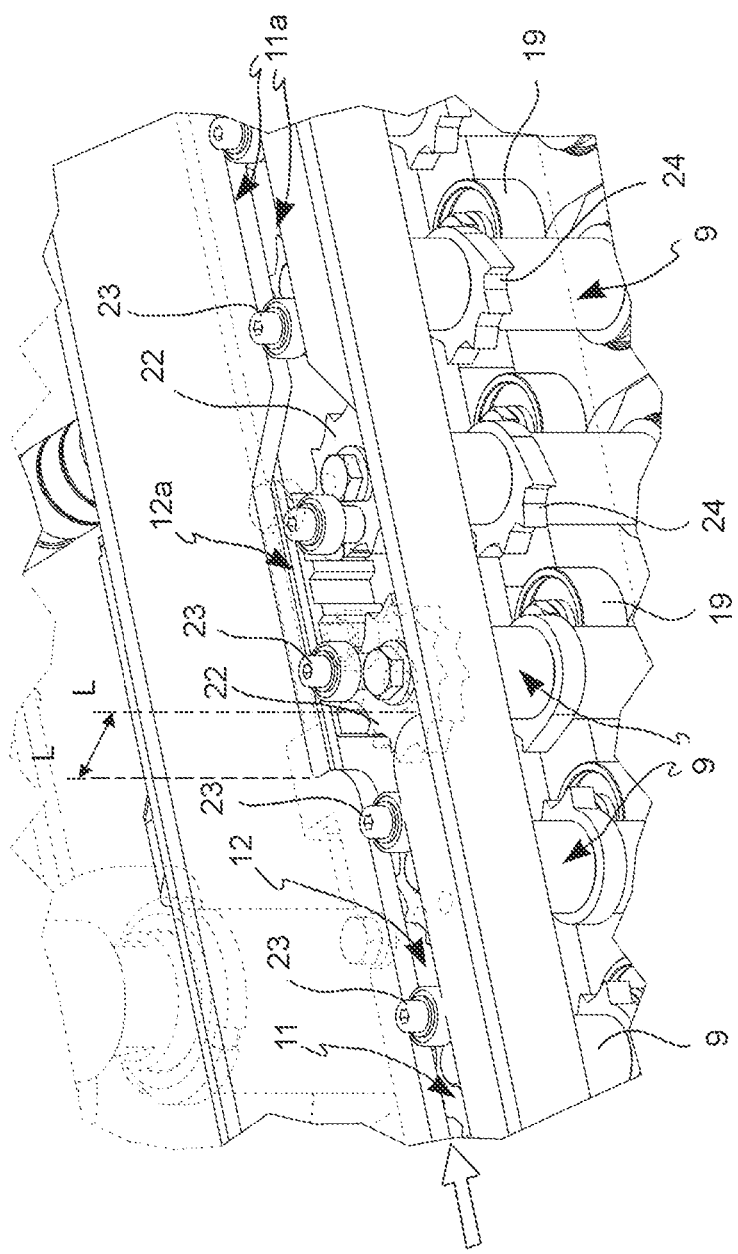
FIG. 5 is a prospective view of a detail of the oven of the invention.

The path 2 comprises, at said at least one second heating unit 10', a sliding guide 11, comprising two sides 11a which define a slot 12 (FIG. 5). The slot 12 has an enlarged portion 12a along the sliding guide 11, in median position with respect to the at least one second heating unit 10'.

Figure 3:
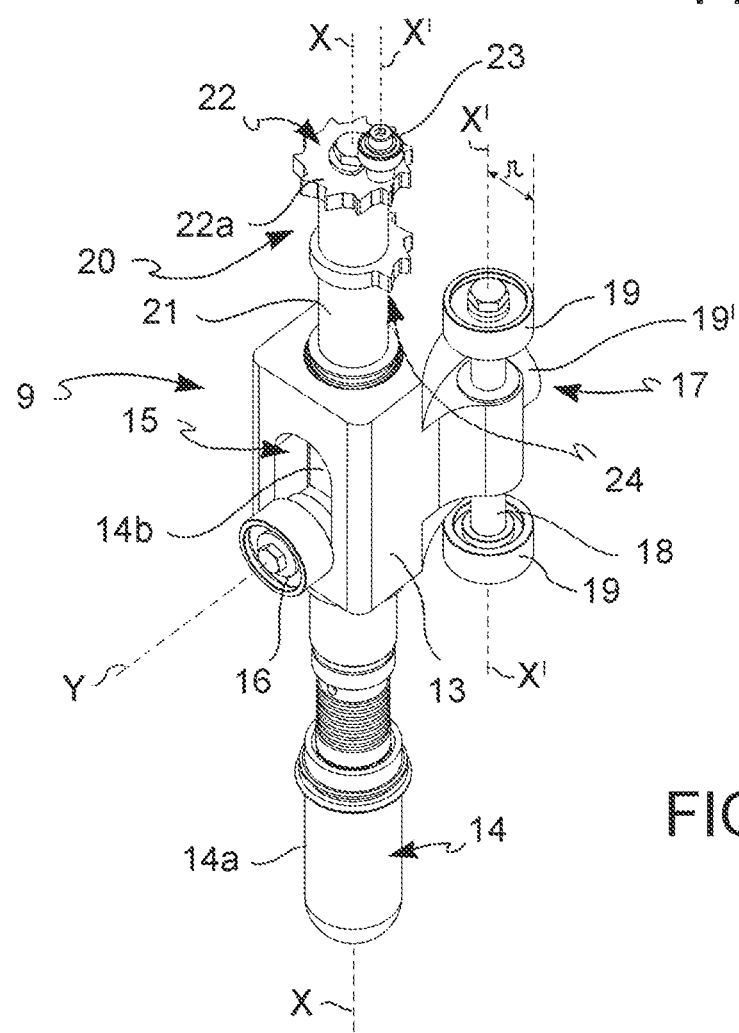
FIG. 3 is a prospective view of a mandrel of the oven in FIG. 2.

With reference now to FIG. 3, a mandrel 9 comprises a body 13, in which a gripping finger 14 for a preform P is slidably inserted. The gripping finger 14 extends along a vertical axis X.

The gripping finger 14 comprises a gripping portion 14a, which protrudes downwards and is configured so as to be inserted into the cavity of a preform P so as to engage therewith, and an actuating portion 14b, which is at least in part inserted in the body 13 of the mandrel 9.

The gripping finger 14 is slidably supported so to move vertically between a retracted position (or releasing position of the mandrel 9) and a lowered position (or engaging position with the mandrel 9). For this purpose, the body 13 has a slot 15 extending vertically, from which a wheel 16 protrudes integral with the actuating portion 14b of the gripping finger 14 and having a rotation axis Y perpendicular to the axis X of the gripping finger 14.

An orientation member 20 extends from the body of the mandrel 9 in substantially vertical direction along the axis X of the gripping finger 14.

The gripping finger 14 is slidably connected, inside the body 13, to the orientation member 20, the gripping finger 14 being maintained in the lowered position (shown in FIG. 3) by gravity. The wheel 16 acts as a driven member of a cam (not shown) provided in the entry and exit zones of the preforms P in and out from the oven 1, so as to obtain the engagement and the disengagement by the mandrel 9, respectively.

The body 13 of the mandrel 9 is further connected to a guide member 17 configured so as to slide on an appropriate slide or track (not shown) positioned along the path 2.

Figure 4:
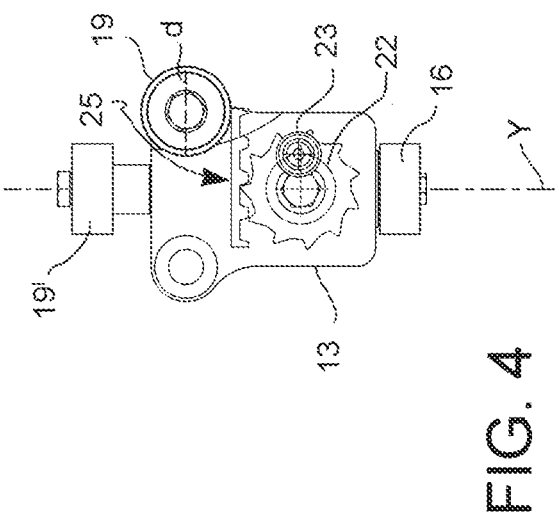
FIG. 4 is a top plan view of the mandrel in FIG. 3 in step of operating.

With reference to FIGS. 3 and 4, in the embodiment shown in the figure, the guide member 17 comprises a shaft 18 arranged vertically, with a rotation axis X' parallel to the axis X of the gripping finger 14. Two wheels 19 are arranged at the ends of the shaft 18. A third wheel 19' is arranged on the body 13, with a rotation axis Y' perpendicular to the rotation axis X of the shaft 18 and preferably parallel to the rotation axis Y of the wheel 16 of the gripping finger 14.

The orientation member 20 comprises a rod 21 having a first end, which is integral in rotation with the gripping finger 14 of the mandrel 9, and a second end which is fixed to a toothed wheel 22. A positioning bearing 23 is rotatably supported on the surface 22a of the toothed wheel 22 facing upwards, in eccentric position with respect to the axis X of the rod 21. The positioning bearing 23 has a diameter d substantially equal to or slightly smaller than the width of the slot 12 of the sliding guide 11. Furthermore, the distance of the axis X of the rod 21 from the axis X" of the positioning bearing 23 added to the radius r of the bearing 23 is substantially equal to or slightly less than half of the width L-L of the enlarged portion 12a of the slot 12. In this manner, at said enlarged portion 12a, the orientation member 20, and therefore also the gripping finger 14 together with the preform P engaged thereto, are free to rotate. Conversely, along the remaining portion of the slot 12, the positioning bearing 23 maintains the orientation member 20 and therefore also the preform P in a fixed position, which may have the bearing 23 positioned at the front (see the mandrels 9 to the left of the enlarged portion 12a in FIG. 5) or at the back (see the mandrels 9 to the right of the enlarged portion 12a in FIG. 5).

A toothed sector 24 is arranged on the rod 21, in intermediate position between the toothed wheel 22 and the first end of the rod 21. The toothed sector 24, the function of which will be apparent in the following description, is arranged in fixed, predetermined position relative to the positioning bearing 23.

The oven 1 further comprises, at least at the first and second heating modules 10, 10', a first toothed belt 25 (of which only one piece is shown in FIG. 4), configured so as to engage with the toothed wheel 22 of the orientation member 20 of the mandrel 9. Therefore, when the mandrel 9, advancing along the path 2, engages the toothed belt 25 with its toothed wheel 22, the advancement itself causes a rotation of the orientation member 20 and therefore also of the preform P around the axis X.

At the at least one first heating unit 10, along said portion of the path 2, the preform P is continuously rotated, whereby obtaining a uniform heating of the entire side surface of the preform P.

At the at least one second heating unit 10', the toothed belt 25 is arranged instead only along the enlarged portion 12a of the slot 12 and has a number of teeth such as to cause a 180° rotation of the orientation member 20 and therefore of the preform P. With reference to FIG. 5, the condition goes from one in which, for example, the positioning bearing 23 is positioned at the front to a condition in which the bearing 23 is arranged at the back. In this manner, inside the at least one second heating unit 10', a heating is obtained only of two opposite portions of the side surface of the preform P, i.e. sections A and C in FIG. 1, while sections B and D, which were heated during the passage through the at least one first heating module 10 do not undergo further direct heating, instead. The desired effect of differentiated heating of the side surface of the preform P necessary to obtain a container with oval section is therefore achieved.

The toothed belt 25 placed at the enlarged portion 12a together with the toothed wheel 22 of the mandrel 9 thus constitute the 180° rotation means of the preform P.

In the end portion 26 of the path 2, upstream of the gripping point by a gripper assembly 7 of the handling system 5, the oven 1 comprises a second toothed belt (not shown) configured so as to engage only with the toothed sector 24 of the rod 21, being arranged at a lower level with respect to the toothed wheel 22. In this manner, if the mandrel 9 appears in that point with the positioning bearing 23 arranged in front, the toothed sector 24 engages with the second toothed belt causing the rotation of the bearing 23 in rear position, so as not to interfere with the guides and handling systems which transfer the preform P to the successive step of blowing. If, instead, the mandrel 9 arrives at the end portion 26 of the path 2 with the positioning bearing 23 in a different position, the toothed sector 24 does not engage with the second toothed belt, whereby preventing the bearing 23 from being accidentally rotated to incorrect position.

Between the second belt and the gripping point of the preform P by a gripper assembly 7 there is a guide for the mandrel bearing so that the preform P can be picked correctly by the gripper.

It is apparent that only some particular embodiments of the present invention have been described, to which a person skilled in the art will be able to make all the changes necessary to adapt it to particular applications, without because of this departing from the scope of protection of the present invention.

What is claimed is:

1. An oven for blowing or stretch-blowing preforms configured to form containers with an oval section, comprising:
    a path for the preforms;
    a plurality of mandrels slidingly carried along the path, the mandrels configured to temporarily engage with the preforms to conduct the preforms along the path wherein each of said mandrels comprises a toothed wheel configured to rotate with the preforms;
    a first heating module at a first position along the path for the preforms and providing heat to the preforms, and a second heating module at a second position along the path for the preforms and providing heat to the preforms, wherein said first heating module is configured to continuously rotate the preforms and to provide a uniform direct heating of an entire side surface of the preforms;
    a toothed belt located at a half of a length of said second heating module within said second heating module along the path for the preforms, the toothed belt being configured to mesh with said toothed wheel, the toothed belt having a quantity of teeth to cause a 180 degree rotation of the toothed wheel and said second heating module is configured to directly heat two opposite portions of the side surface of the preforms to provide differentiated heating of the side surface of the preforms;
    wherein the path for the preforms comprises, at said second heating module, a sliding guide comprising two sides, the two sides defining a slot, and wherein the slot has a widened portion along the sliding guide, in a median position with respect to said second heating module;
    wherein the mandrel comprises a body inside of which a gripping finger for a preform is slidingly inserted, the finger extending along a vertical axis, and wherein an orientation member extends from the body along said vertical axis, in a direction opposite to the gripping finger, said orientation member being configured for engagement and rotation with said gripping finger;
    wherein the orientation member comprises a rod having a first end, which is aligned in rotation with the gripping finger of the mandrel, and a second end to which said toothed wheel is fastened, and wherein a positioning bearing configured to slide in said slot of said sliding guide is pivotally supported on a surface of the toothed wheel facing upwards, the positioning bearing having a rotation axis, a diameter and a radius;
    wherein the positioning bearing has a diameter which is equal to or less than a width of the slot of the sliding guide, and wherein a distance of an axis of the orientation member from the axis of the positioning bearing added to the radius of the bearing is equal to or less than half of a width of a widened portion of the slot, wherein at the widened portion of the slot, the toothed wheel engages the toothed belt and advancement rotates the preform in the widened portion of the slot; and
    wherein the orientation member is freely rotatable up to 180°, and rotationally aligned with the gripping finger, by the toothed belt at said widened portion of the slot, and wherein the orientation member and the gripping finger are configured to rotate together in a fixed position along a remaining portion of the slot.

2. The oven according to claim 1, wherein a toothed sector is arranged on the rod, in an intermediate position between the toothed wheel and the first end of the rod, the toothed sector being arranged in a fixed and predetermined position with respect to the positioning bearing.

3. The oven according to claim 2, wherein the oven comprises, in an end portion of the path, a second toothed belt configured to mesh only with the toothed sector of the rod.

4. The oven according to claim 1, further comprising one or more additional first heating modules spaced along the path, wherein the heated entire side surface is exposed to said first heating module or said one or more additional first heating modules.

5. The oven according to claim 1, comprising:
    one or more additional first heating modules and one or more additional first positions along the path, each of said first heating module or said one or more additional first modules being at one of said first position or said one or more additional first positions along the path; and
    one or more additional second heating modules and one or more additional second positions along the path, each of the second heating module or said one or more additional second heating modules being at one of said second position or said one or more additional second positions along the path.

6. The oven according to claim 1, wherein said second heating module is configured to sequentially heat directly the two opposite portions of the side surface of the preforms.

* * * * *